(12) United States Patent
Bon et al.

(10) Patent No.: US 8,683,687 B2
(45) Date of Patent: Apr. 1, 2014

(54) METHOD FOR MANUFACTURING A CRANKCASE OF A PISTON COMPRESSOR, CRANKCASE OBTAINED WITH THE METHOD AND PISTON COMPRESSOR PROVIDED WITH SUCH CRANKCASE

(75) Inventors: George Jan Bon, Rosmalen (NL); Jacobus Petrus Maria van Houten, Schijndel (NL); Joseph Johannes Adrianus Maria van den Oetelaar, Den Dungen (NL)

(73) Assignee: Grasso-Products B.V., 'S-Hertogenbosch (NL)

( * ) Notice: Subject to any disclaimer, the term of this patent is extended or adjusted under 35 U.S.C. 154(b) by 936 days.

(21) Appl. No.: 12/744,292

(22) PCT Filed: Nov. 24, 2008

(86) PCT No.: PCT/NL2008/050744
§ 371 (c)(1),
(2), (4) Date: Jul. 8, 2010

(87) PCT Pub. No.: WO2009/067014
PCT Pub. Date: May 28, 2009

(65) Prior Publication Data
US 2010/0282073 A1 Nov. 11, 2010

(30) Foreign Application Priority Data
Nov. 22, 2007 (NL) .................................. 2001028

(51) Int. Cl.
*B21K 3/00* (2006.01)
*F02F 7/00* (2006.01)
*F16M 1/00* (2006.01)

(52) U.S. Cl.
USPC ...... 29/888.01; 92/169.1; 92/261; 126/195 S; 228/170; 228/173.6

(58) Field of Classification Search
USPC ............... 29/888.01, 888.012; 92/169.1, 261; 123/195 S; 228/173.6, 170
See application file for complete search history.

(56) References Cited

U.S. PATENT DOCUMENTS

| 2,159,008 A | 5/1936 | Chapman |
| 2,056,622 A | 10/1936 | Schaer |

(Continued)

FOREIGN PATENT DOCUMENTS

| DE | 1035969 B | 6/1958 |
| FR | 1195776 A | 11/1959 |
| JP | 50-26192 A | 2/1985 |

*Primary Examiner* — Alexander P Taousakis
(74) *Attorney, Agent, or Firm* — Birch, Stewart, Kolasch & Birch, LLP

(57) ABSTRACT

Method for manufacturing a crankcase of a piston compressor, wherein the piston compressor is provided with a crankcase which is provided with recesses for therein receiving cylinders and with at least an inlet opening, wherein from a flat sheet at least one substantially rectangular body blank is manufactured provided with the desired cylinder receiving recesses, wherein the body blank is then angle bent in an angle bending machine for forming a body part having a limited number of folds, wherein at least two substantially flat end walls are manufactured from a flat sheet, wherein thereupon the at least one body part and the at least two end walls are positioned with respect to each other using a positioning tool and are connected with each other with a welding robot for forming the crankcase. Also disclosed is a crankcase obtained with the method, and a piston compressor provided with such a crankcase.

15 Claims, 23 Drawing Sheets

(56) References Cited

U.S. PATENT DOCUMENTS

| | | |
|---|---|---|
| 2,078,056 A | 4/1937 | Chapman |
| 2,975,776 A | 3/1961 | Wilcox |
| 7,146,724 B2 * | 12/2006 | Millerman ................ 29/888.01 |

* cited by examiner

METHOD FOR MANUFACTURING A CRANKCASE OF A PISTON COMPRESSOR, CRANKCASE OBTAINED WITH THE METHOD AND PISTON COMPRESSOR PROVIDED WITH SUCH CRANKCASE

The invention relates to a method for manufacturing a crankcase of a piston compressor, wherein the piston compressor is provided with a crankcase which is provided with recesses for receiving cylinders therein and with at least an inlet opening.

From practice, it is known to cast the crankcase of a piston compressor and then to subject the casting, at the location of bearing recesses, cylinder recesses and inlet and outlet openings, to final processing with a material removing operation such as milling, boring or the like. Such piston compressors are marketed by applicant, for instance under the series designation Grasso 6. Such piston compressors can be manufactured relatively inexpensively. Owing to the relatively thick-walled crankcases, however, such piston compressors having a cast crankcase need to be actively cooled with a cooling medium. Such cooling medium installations which are to be supplied with the piston compressors, however, in turn have a cost increasing effect on the total system.

From practice, it is also known to manufacture the crankcase of a piston compressor by welding from steel parts, more particularly from steel pipe parts. Such piston compressors are marketed by applicant, for instance under the series designation Grasso 10. Such welded crankcases being relatively thin-walled, active cooling with cooling medium can be dispensed with. This accomplishes a considerable saving of costs for the total system to be supplied. The piston compressors hitherto manufactured by welding, however, are relatively costly compared with piston compressors having a cast crankcase because manufacturing the crankcase involves a great deal of manual welding. As the crankcase portion containing the crankshaft is of cylindrical design, it is difficult to provide the necessary recesses in it. Also, positioning the cylinder case chambers on the cylindrical crankcase part is complex and requires manual operations.

U.S. Pat. No. 2,975,778 discloses a method for manufacturing a 'cylinder head-en-block' from sheet metal and tubing (col. 1, ll. 36-38). A 'cylinder head-en-block' is understood to mean a structure comprising a plurality of cylinders, the heads and ports associated with each of the cylinders, the water jacket surrounding the cylinders, and associated parts (col. 1, ll.24-28). A 'cylinder head-en-block' is understood not to encompass a crankcase, which is cast in the preferred embodiment of that publication, and is mounted underneath the 'cylinder head-en-block' (col. 2, ll.29-30). U.S. '778 only discloses a water jacket manufactured from a metal sheet folded into a U-shape, a bottom plate, and a pair of end walls. Provided in the bottom plate—which in the terminology of the application may be regarded as a 'body part'—are cylinder receiving recesses (FIG. 2; col. 2, ll.35-37; col. 3, ll.3-4).

FR 1,195,776 (1959) discloses a frame for piston machines. In particular, FIG. 7 shows a welded frame which is suitable for use in a V motor. The frame has two mutually inclined connecting plates (51). The inclination of the connecting plates is related to the angle of inclination of the cylinders. Furthermore, the frame comprises multiple crosswise positioned thin metal plates (52) which are each provided with a circular opening (53) for receiving a crankshaft bearing, two carrier plates (54) which are provided with openings for receiving cylinders and bolts, a cover plate (55) which is connected with the two carrier plates (54) through a welded joint, and finally two bottom plates (56). FR '776 does not disclose a body part provided with cylinder receiving recesses, which is manufactured from a sheet which has been angle-bent a number of times. Nor does it disclose the use of an angle bending machine, positioning tool or a welding robot.

DE 1,035,969 (1958) discloses a force-absorbing assembly ("Kraftverband") for a crankcase which is welded/manufactured from sheet metal, in particular for use in piston power machines with cylinders placed in a V shape. The crankcase is formed from different parts, as from a housing wall ("Gehäusewand G"), cover plates ("Abdeckbleche A") and draw plates ("Zugbleche Z"). The assembly is intended to transfer the cylinder forces directly onto the crankshaft without unduly loading the sidewalls of the crankcase (col. 1, ll.1-11). DE '969 does not explicitly disclose an angle bending machine, positioning tool or a welding robot.

The present invention contemplates a method for manufacturing a crankcase of a piston compressor that combines the advantages of a cast crankcase, viz. a relatively low cost price for the manufacture of the crankcase, with the advantages of a welded crankcase, viz. a relatively low system price due to the fact that a cooling device for active cooling of the piston compressor in use can be dispensed with.

To this end, the invention provides a method for manufacturing a crankcase of a piston compressor, wherein the piston compressor is provided with a crankcase which is provided with recesses for receiving cylinders therein and with at least an inlet opening, the method comprising:

providing at least two substantially rectangular body blanks manufactured from a flat sheet, which are each provided with two opposite end edges and two longitudinal edges;

providing desired cylinder receiving recesses for receiving cylinders in the two body blanks;

angle bending the body blanks in an angle bending machine for forming a body part with a limited number of folds;

manufacturing from flat sheet at least two substantially flat end walls from a flat sheet;

manufacturing a cylinder support part from a substantially rectangular sheet, comprising:

providing cylinder receiving recesses in the substantially rectangular sheet; and subjecting the rectangular sheet to at least one angle bending operation for forming a saddle-shaped cylinder support part with a limited number, preferably one or two, of folds;

positioning the two body parts, the cylinder support part and the at least two end walls relative to each other using a positioning tool; and connecting the end walls and the two body parts to each other with a welding robot, for forming the crankcase.

The invention further provides a crankcase of a piston compressor which has been obtained with the method according to the invention.

In an embodiment, the crankcase comprises two end walls manufactured from flat sheet, two body parts manufactured from flat sheet which contain only parallel folds and recesses, and one cylinder support part manufactured from flat sheet, of saddle-shaped design through a single fold or two folds.

In a further elaboration, the crankcase is more particularly provided with two body parts, two end walls and a cylinder support part, wherein the two body parts have each been formed from a flat sheet by an angle bending operation, wherein each body part is provided with a bottom part, a crankcase part, a cylinder case part, a cylinder head part and a top part, wherein the parts mentioned are separated from each other by parallel folds, wherein in a position of use of the crankcase the bottom part extends from a lower edge thereof obliquely outwardly upwards, wherein from an upper edge of the bottom part the crankcase part extends substantially vertically upwards, wherein from an upper edge of the crankcase part the cylinder case part extends substantially obliquely outwardly upwards, wherein from an upper edge of the cylinder case part the cylinder head part extends substantially obliquely inwardly upwards, wherein from an upper edge of the cylinder head part the top part extends obliquely inwards substantially horizontally, wherein one longitudinal edge mentioned forms the free lower edge of the bottom part and the other longitudinal edge mentioned forms the free edge of the top part, wherein both longitudinal edges mentioned both extend in one imaginary plane, which in the position of use of the crankcase extends in substantially vertical direction, wherein the cylinder support part is provided with cylinder receiving recesses, is saddle-shaped with a limited number, preferably one or two, of folds and is connected by its circumferential edges with the body parts and the end walls by robot welding, and wherein the end walls and the body parts are connected with each other by robot welding.

One major advantage is that the crankcase is manufactured from a minimal number of parts, namely: two body parts, two end walls and a cylinder support part. Another major advantage of the method according to the invention is that it can be carried out substantially in an automated manner. Thus, the manufacture of the body blanks, the end wall blanks, the cylinder support part blank and the partition, if any, can be carried out on a computer controlled CNC laser cutter, CNC waterjet cutter or a blanking tool, since the body blanks, the end wall blanks, the cylinder support part blank and the partition, if any, are flat and are obtained from flat sheet. Forming the body parts, the end walls and the cylinder support part from the corresponding blanks can also be done in an automated manner on, for instance, a CNC angle bending machine. Since the folds to be provided in the body blanks and the cylinder support part blank are all parallel, automation of the angle bending operation is readily possible. Next, the body blanks, the partition if any, and the end walls and the cylinder support part need to be positioned relative to each other utilizing a positioning tool and the various parts can be welded together in an automated manner using a welding robot. Only placing the parts on the positioning tool may involve an operation by an operator. In case of large series, however, it is also possible to automate such placement of parts on the positioning tool. After placement, the welding robot can provide the various welded joints in an automated manner. It is also possible for placing of a part and robot welding to be done in alternation. Thus it is possible, for instance, first to position two body parts and an end wall and to join these together through a robot welding operation. Next, for instance the cylinder support part may be positioned, which is thereupon joined with the body parts and the end wall through a robot welding operation. Finally, the last end wall can be positioned and be joined to the body parts and the cylinder support part by robot welding.

The invention further provides a piston compressor provided with a crankcase according to the invention obtained with the method according to the invention.

Such a piston compressor has the advantage that it does not need to be actively cooled using cooling liquid, which keeps the cost price of the total piston compressor system low. As the crankcase is manufactured according to the method according to the invention, the crankcase too, despite being welded, is relatively cheap to realize.

In further elaboration, the piston compressor may be provided with cylinder heads which are connected with the crankcase through bolts and further make contact with the crankcase only via thin-walled cylinders.

What can thus be accomplished is that the relatively hot cylinder heads in which the compressed gas is pressed are thermally well-insulated from the crankcase. Accordingly, this prevents the crankcase rising in temperature. A low temperature of the crankcase further results in the intake gas remaining relatively cold. This in turn leads to a better efficiency of the compressor, without this necessitating active cooling with cooling liquid.

Further elaborations of the invention are described in the subclaims and will be further clarified hereinafter on the basis of an exemplary embodiment, with reference to the drawing.

The exemplary embodiment shown in FIGS. 1-5 of a crankcase 1 of a piston compressor is provided with two body parts 2, 3, and two end walls 4, 5. Situated in the interior of the crankcase is a cylinder support part 6, well visible in FIGS. 4 and 5 and better visible in FIG. 14. Owing to the small number of parts, the crankcase 1 can be produced in an economical and simple manner. Moreover, a durable and stiff construction is provided.

Presently, on the basis of FIGS. 6-14, the method of manufacturing a crankcase as shown in FIGS. 1-5 will be further clarified.

Figure 1:
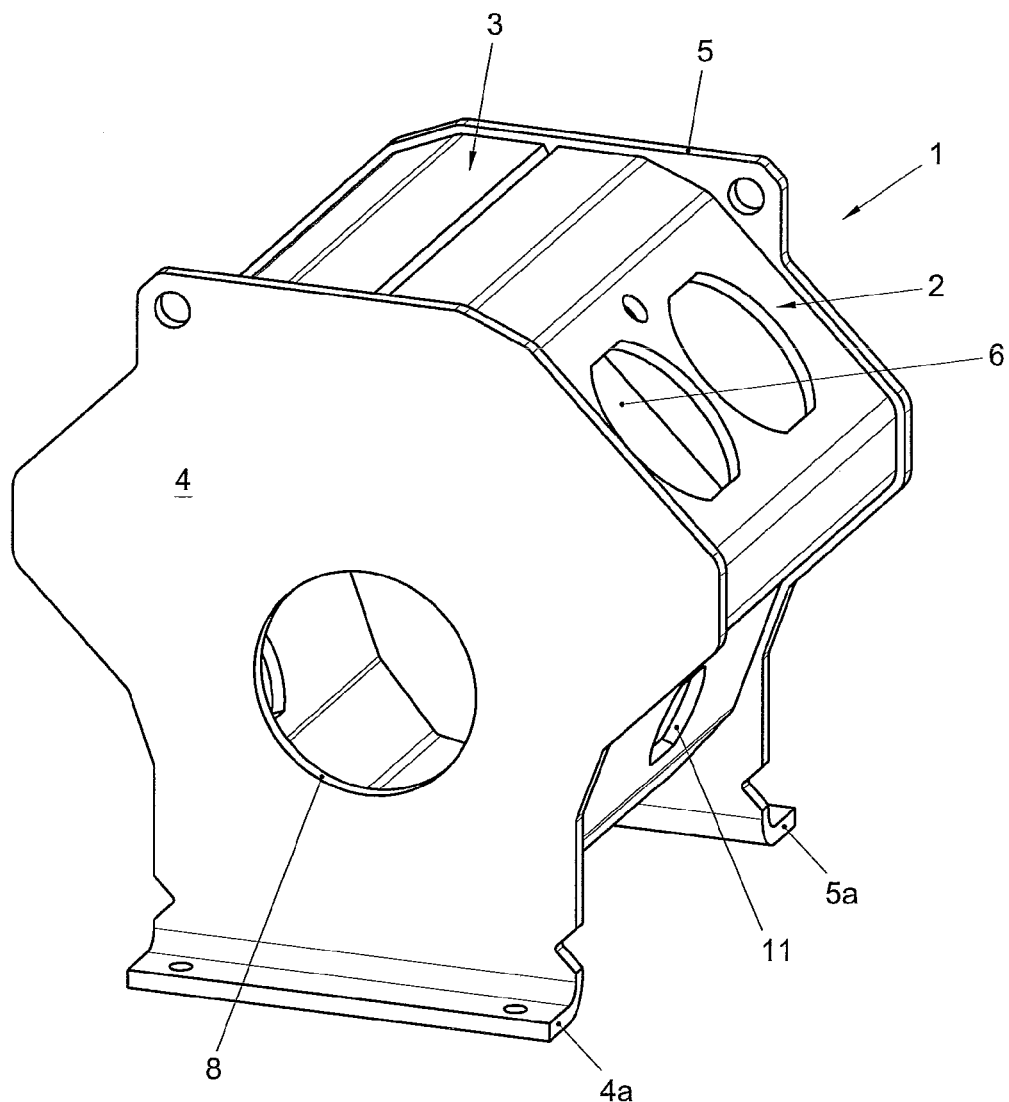
FIGS. 1 and 2 show a first exemplary embodiment of a crankcase in perspective view.
Figure 2:
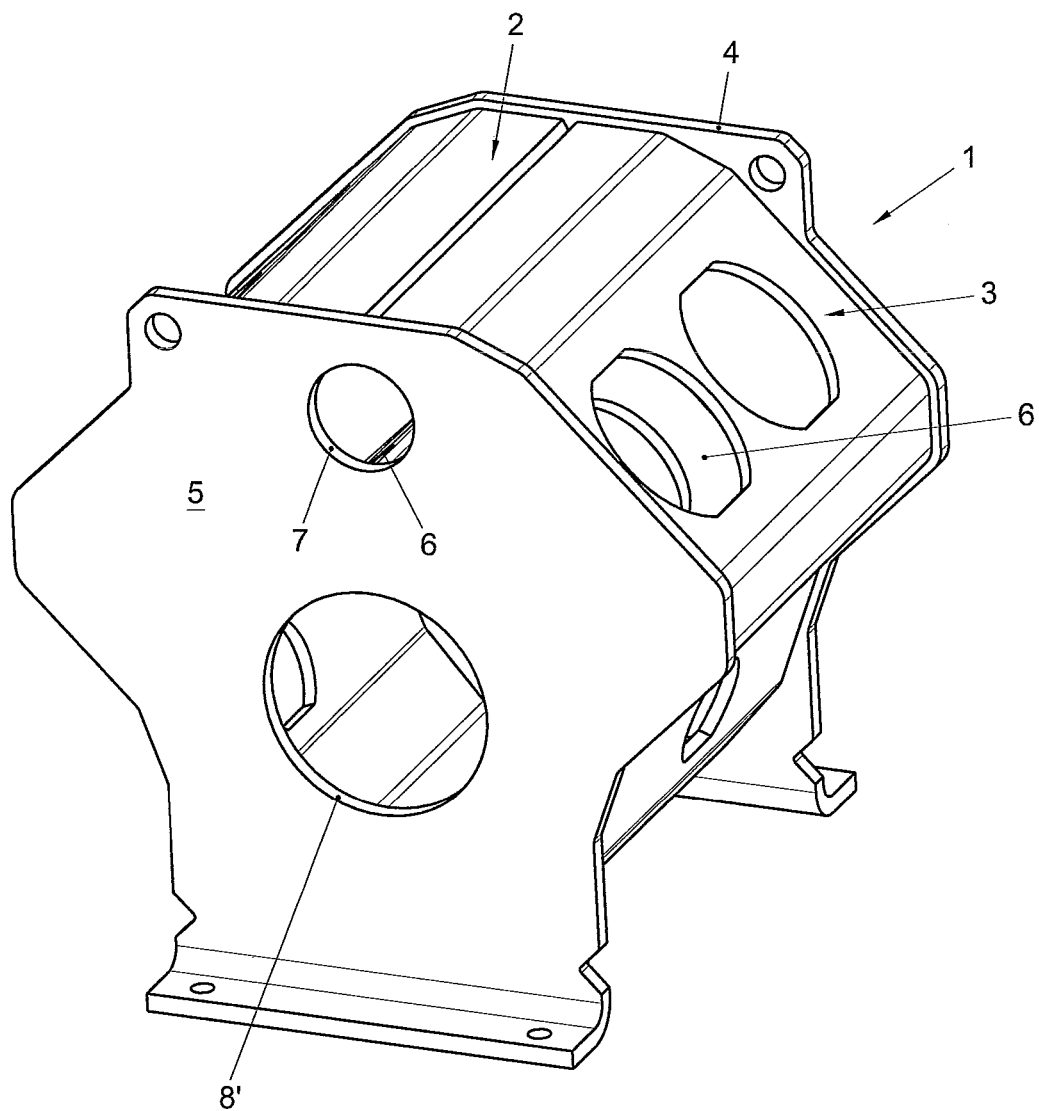
Figure 3:
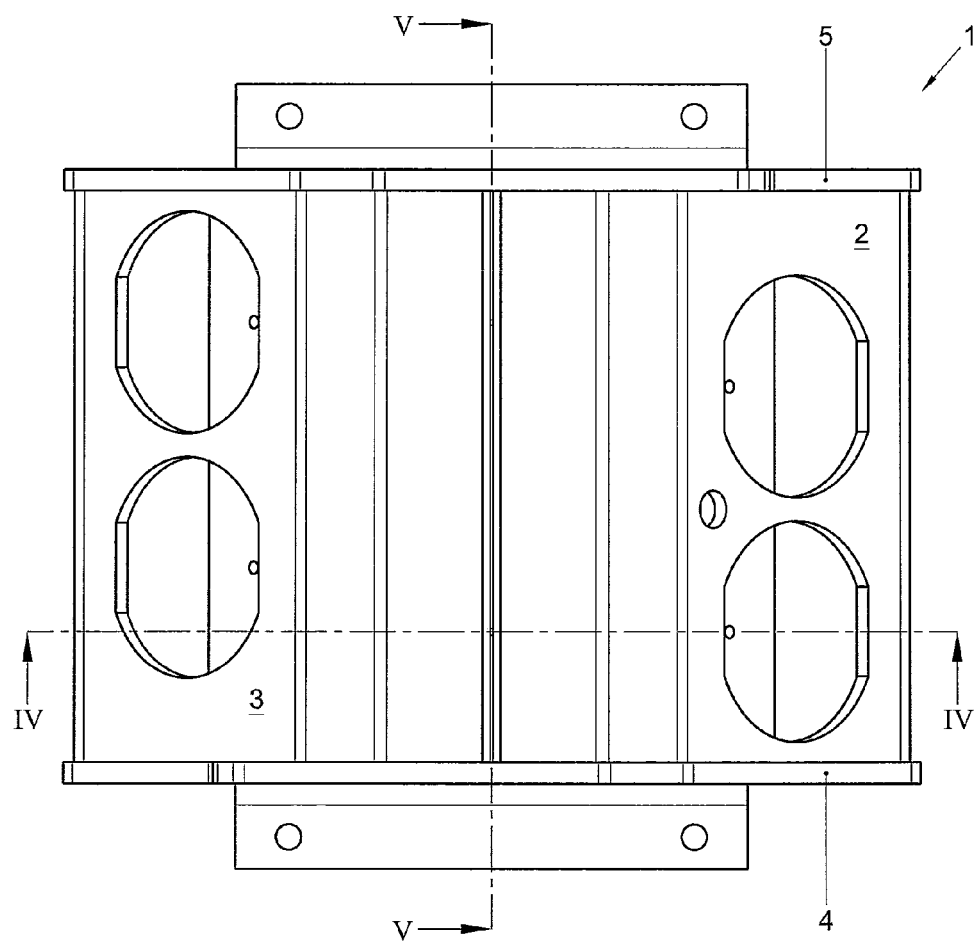
FIG. 3 shows a top plan view of the exemplary embodiment represented in FIGS. 1 and 2.
Figure 4:
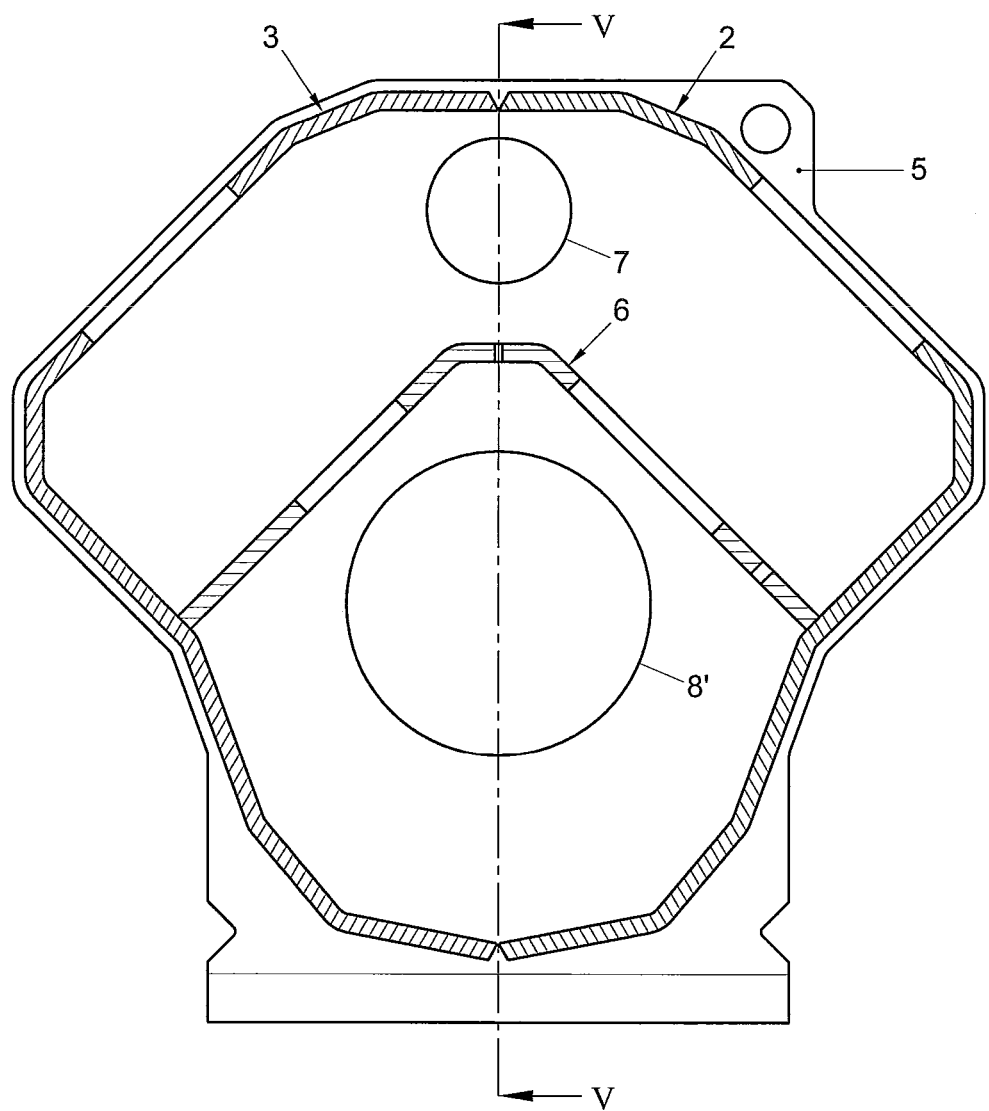
FIG. 4 shows a section on line IV-IV from FIG. 3.
Figure 5:
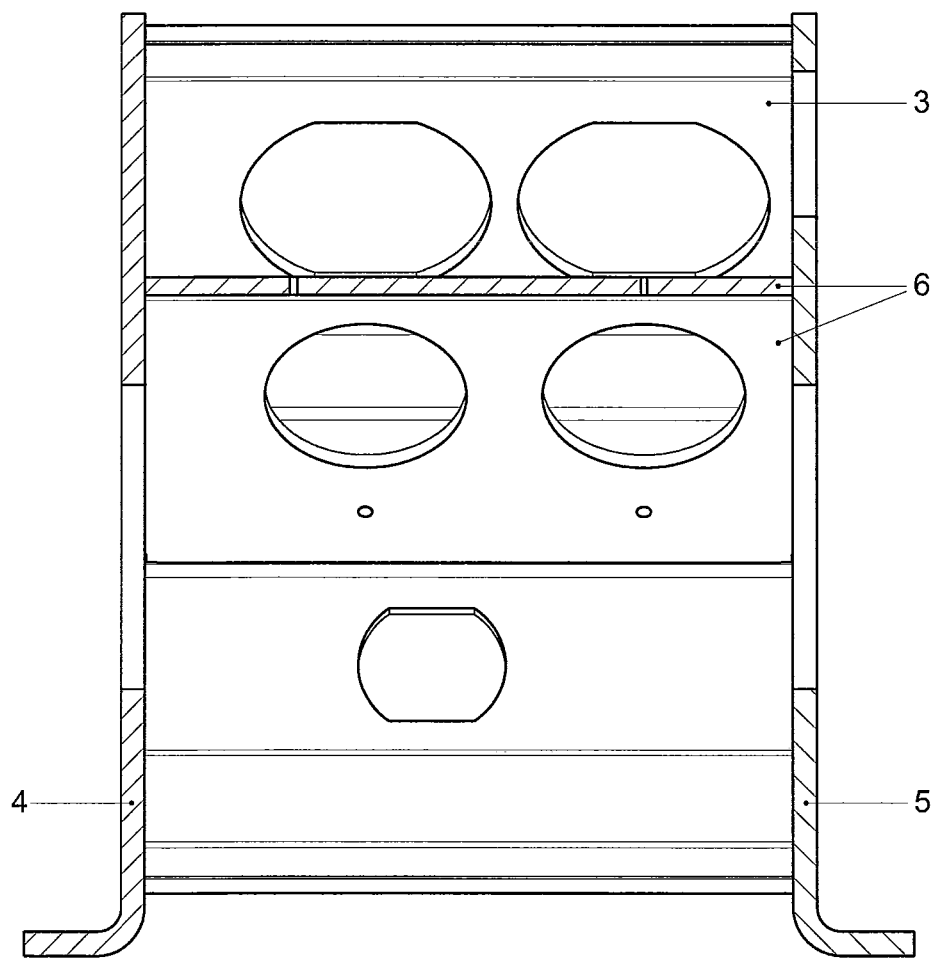
FIG. 5 shows a section on line V-V from FIG. 4.
Figure 6:
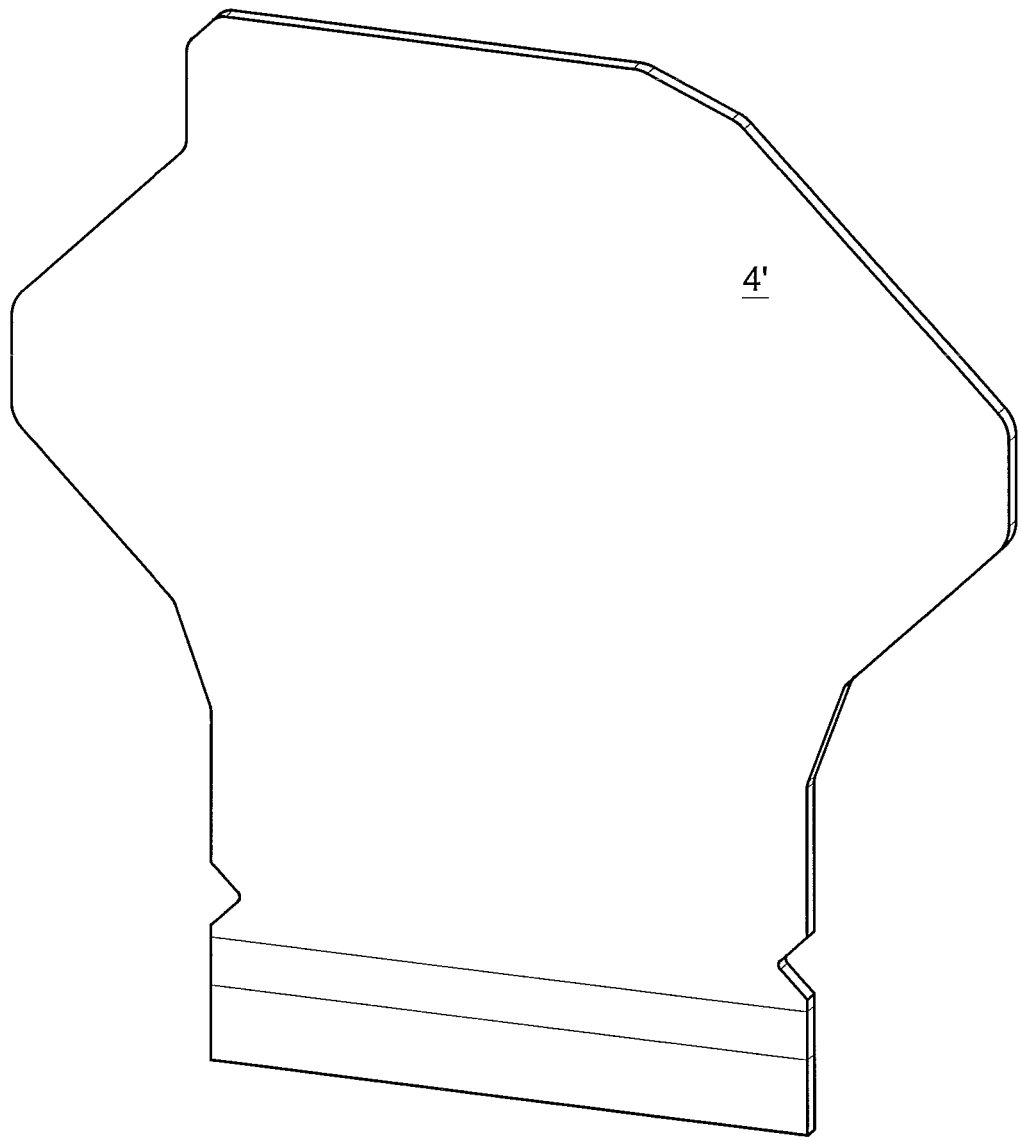
FIG. 6 shows an end wall blank.
Figure 7:
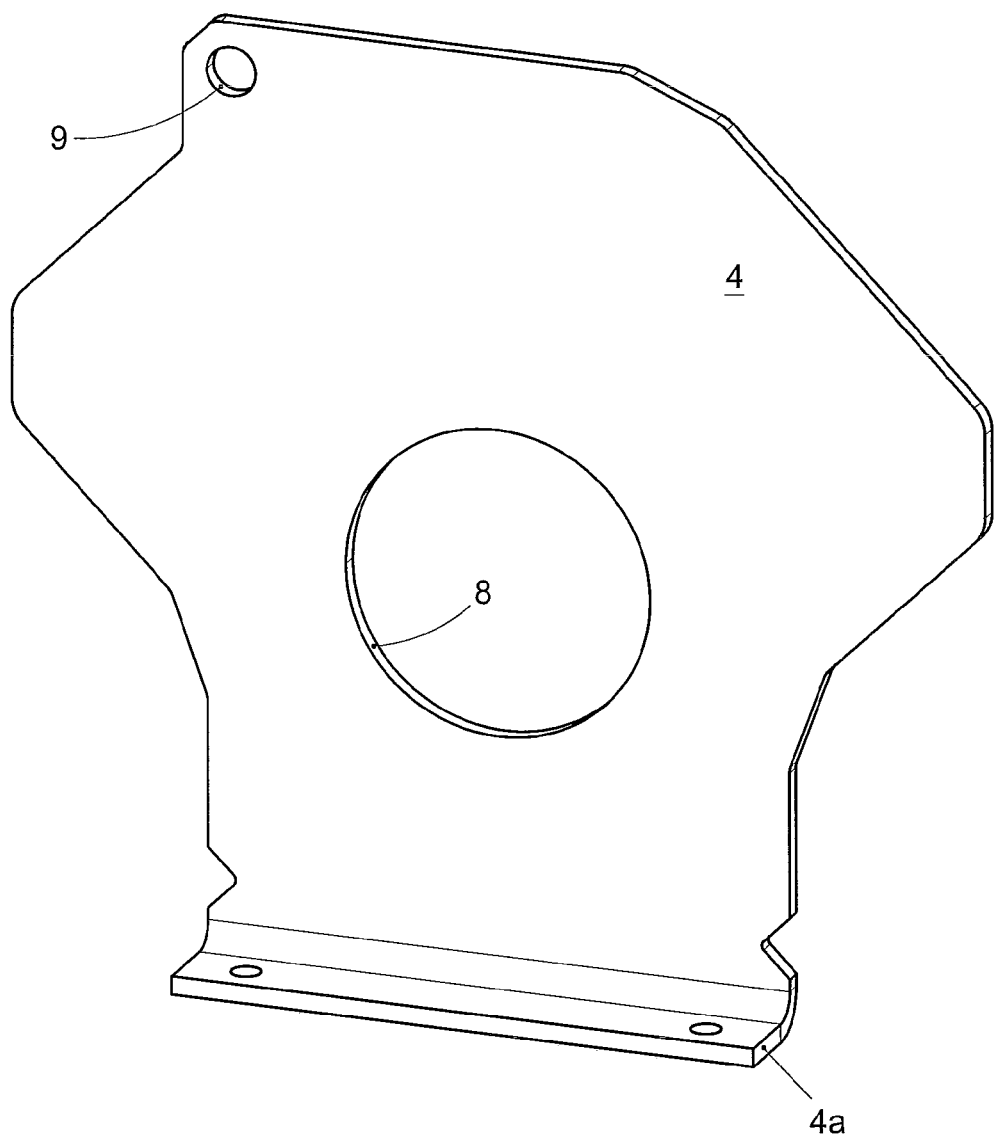
FIG. 7 shows the end wall manufactured from the end wall blank shown in FIG. 6.

FIG. 6 shows an end wall blank 4'. The end wall blank 4' can have been obtained, for instance, by laser cutting, waterjet cutting or punching from steel sheet material. Especially these first two manufacturing techniques have a high accuracy and yield cut edges that are so fine as not to require any final processing. Using the same techniques, the requisite recesses can be provided in the end wall blank 4'. FIG. 7 shows the end wall 4 with the recesses provided therein. The large central recess 8 serves for mounting a crankshaft bearing in it. The small recess 9 serves as lifting eye. Further, the end wall blank 4' has undergone a single angle-bending operation to form a base 4a.

Figure 8:
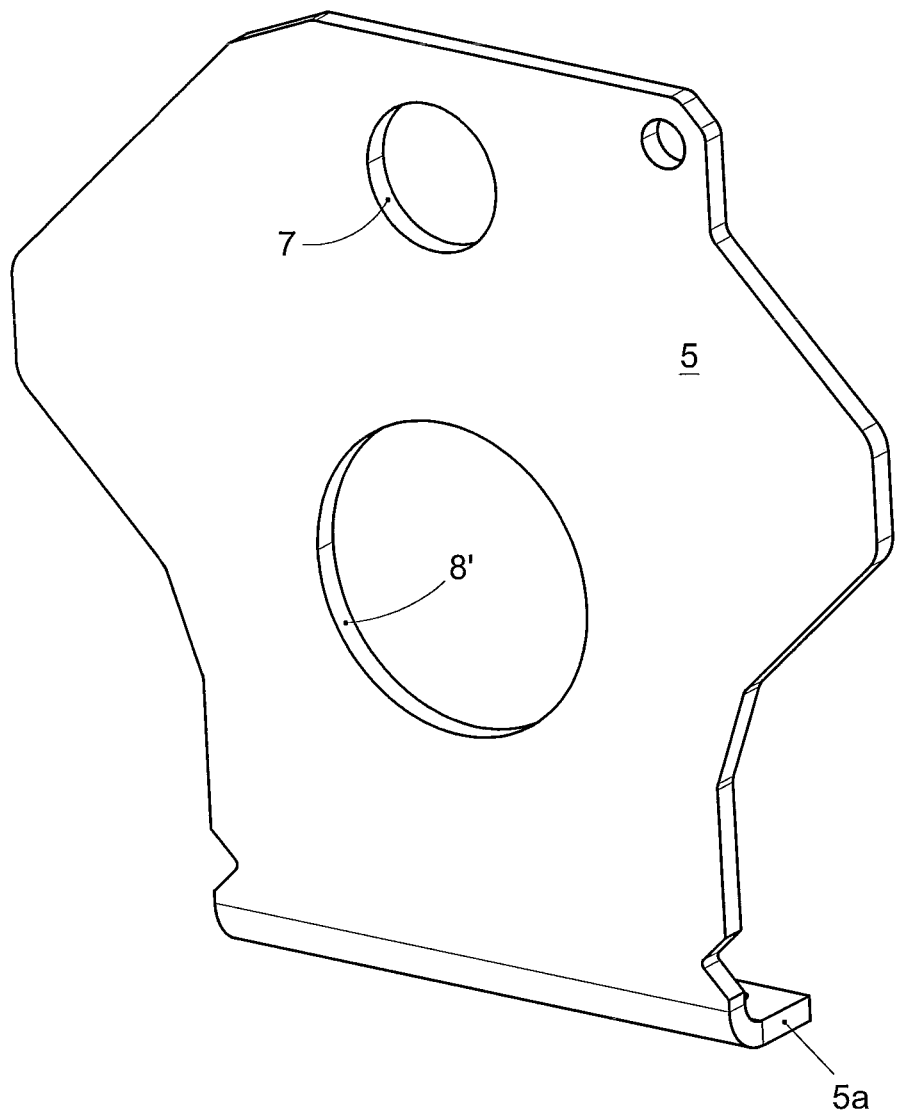
FIG. 8 shows the second end wall.

FIG. 8 shows the other end wall 5 in ready condition. That end wall includes, in addition to the bearing recess 8' for the crankshaft, an inlet opening 7. Further to be seen is a base 5a, formed by a single angle-bending operation.

Figure 9:
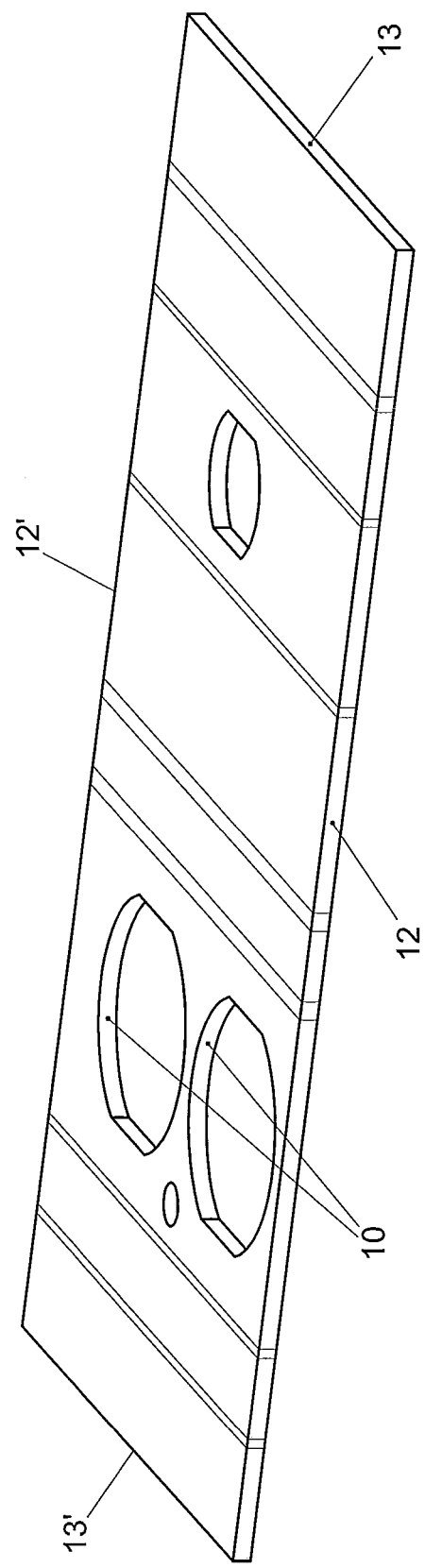
FIG. 9 shows a first body part blank.

FIG. 9 shows a rectangular body blank 2' with cylinder recesses 10 and an inspection recess 11. The body blank 2' with the recesses 10, 11 provided therein has been manufactured, for instance, by laser cutting, waterjet cutting or punching from a steel plate. As already noted hereinabove, especially these first two manufacturing techniques have a high accuracy and these techniques yield cut edges that are so fine as not to require any final processing. The body blank 2' is provided with two end edges 12, 12' and two longitudinal edges 13, 13'. The cylinder recesses 10 shown are intended for subsequently receiving cylinders of the piston compressor therein. The inspection recess 11 may be used later to obtain access to the crankshaft for maintenance. Further, via the cylinder recesses 10 and inspection recess 11, robot welding activities in the interior of the crankcase can be carried out in that the robot welding torch can reach via these recesses 10, 11 into the interior of the crankcase. This last also holds for the bearing recesses 8, 8' in the end walls 4, 5.

Figure 10:
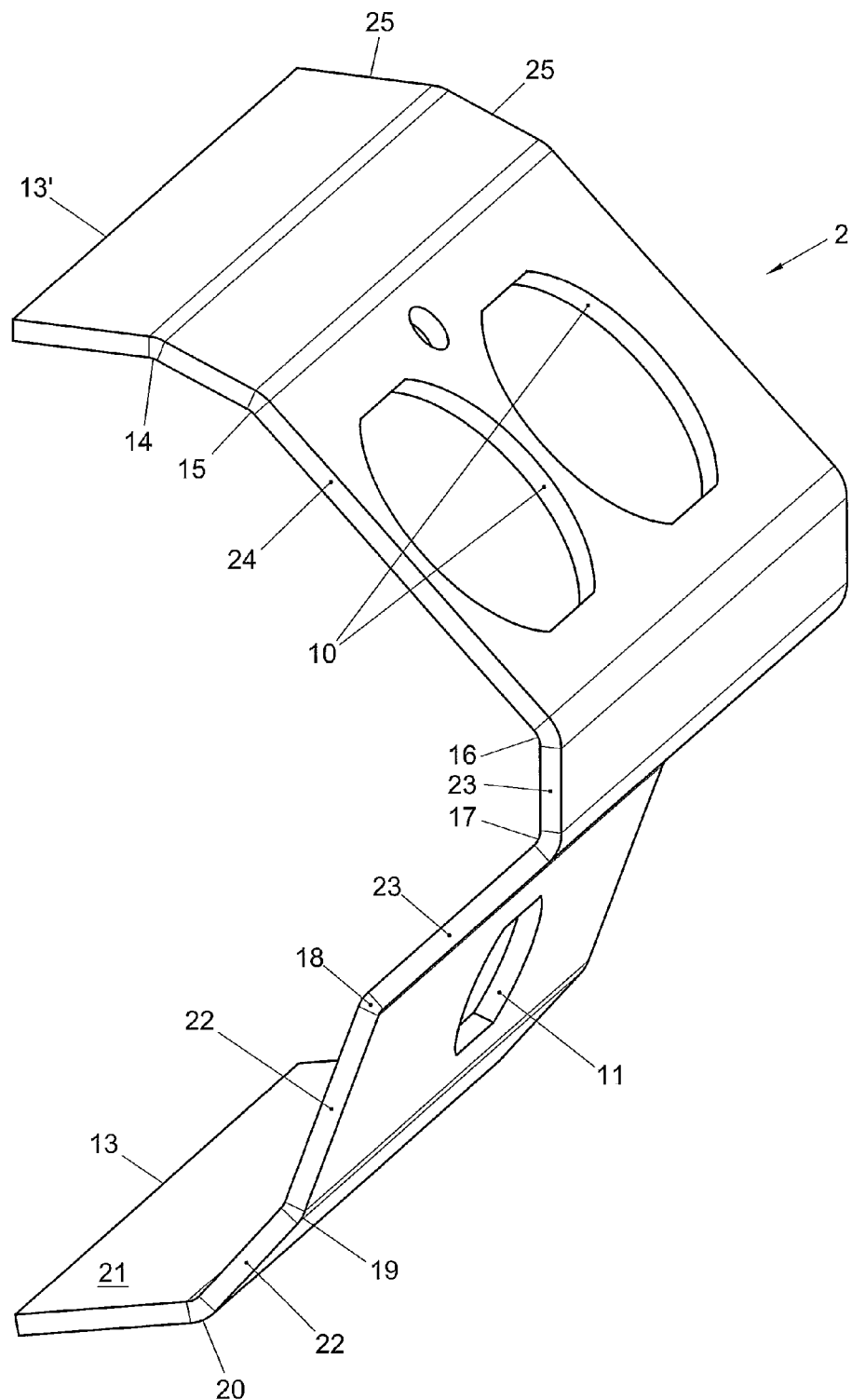
FIG. 10 shows a first body part formed from the first body part blank shown in FIG. 9.

FIG. 10 shows body part 2 which is obtained by subjecting the body blank 2' to different angle-bending operations, whereby successively parallel folds 14-20 are provided.

Figure 11:
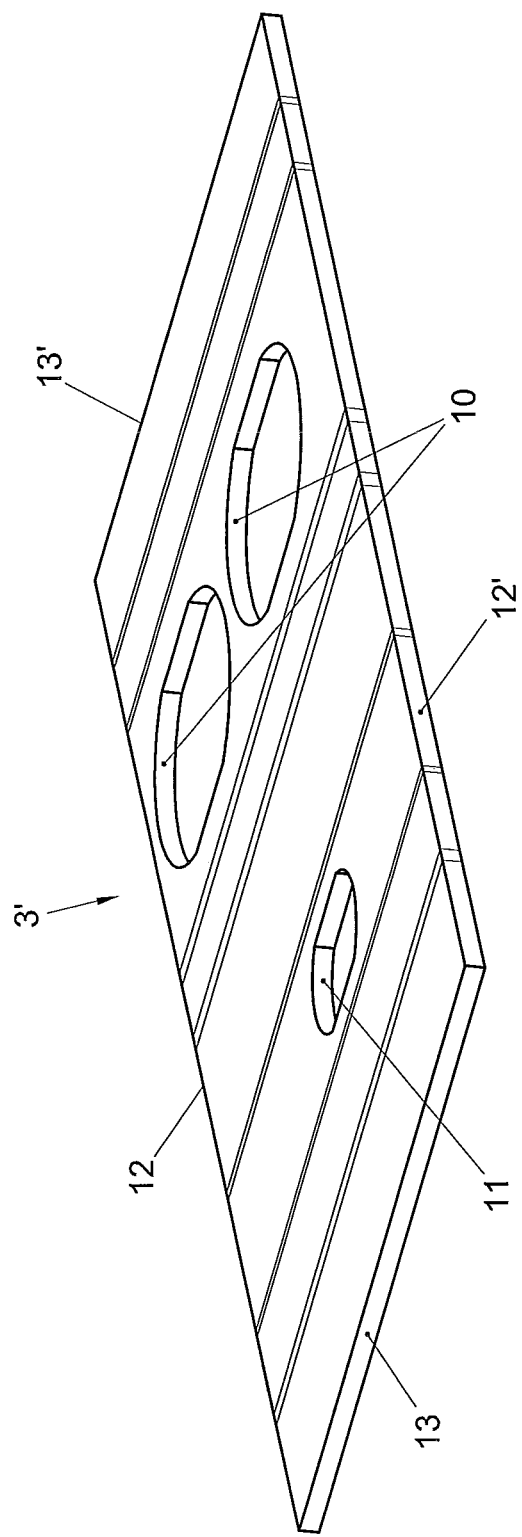
FIG. 11 shows a second body part blank.
Figure 12:
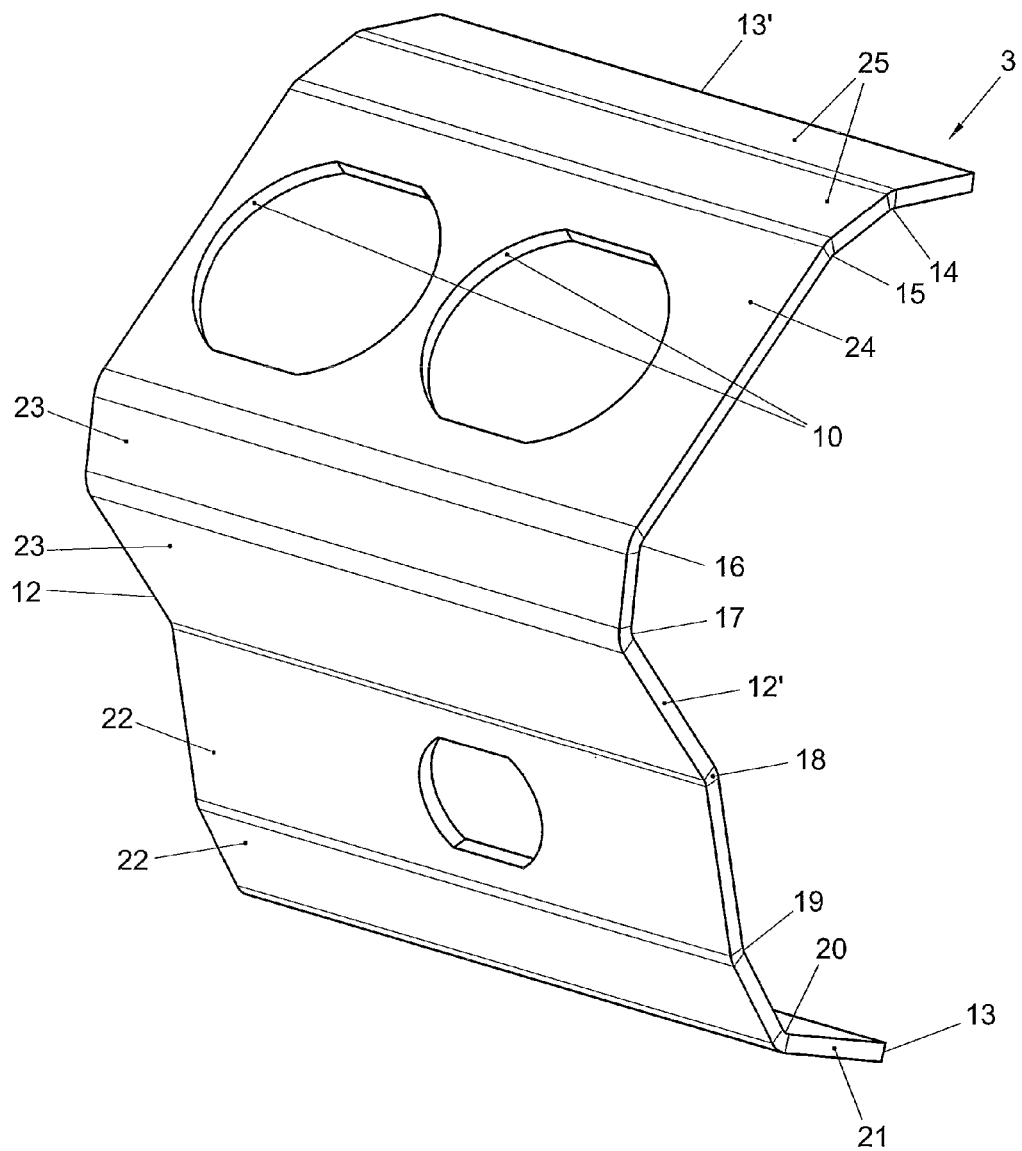
FIG. 12 shows a second body part formed from the second body part blank from FIG. 11.

FIG. 11 shows the body blank 3' for forming the other body part 3, which is represented in ready form in FIG. 12.

FIGS. 10 and 12 clearly show that a body part 2, 3 is provided with a bottom part 21, of which a free lower edge 13 is formed by the longitudinal edge 13 of the body blank 2'. The bottom part 21 extends from the free lower edge 13 outwardly, obliquely upwards. Via the fold edge 20, the bottom part 21 is connected with a crankcase part 22 which extends substantially in vertical direction. The crankcase part 22 includes the inspection recess 11 and fold edge 19. Connected with the crankcase part 22 via fold edge 18 is a cylinder part 23 which extends from the fold edge 18 obliquely upwards, outwardly, and includes fold edge 17. From fold edge 16, a cylinder head part 24 extends obliquely upwards, inwardly. The cylinder head part 24 includes the cylinder receiving recesses 10. As the cylinder head part 24 is flat, leak-tight mounting of the cylinder head on that cylinder head part is simpler. From fold edge 15, a top part 25 extends substantially horizontally, inwardly. The free edge 13' of the top part 25 is formed by the longitudinal edge 13' of the body blank 2'. In the condition of use of the crankcase 1, both free longitudinal edges 13, 13' extend in a plane which is substantially vertical.

Figure 13:
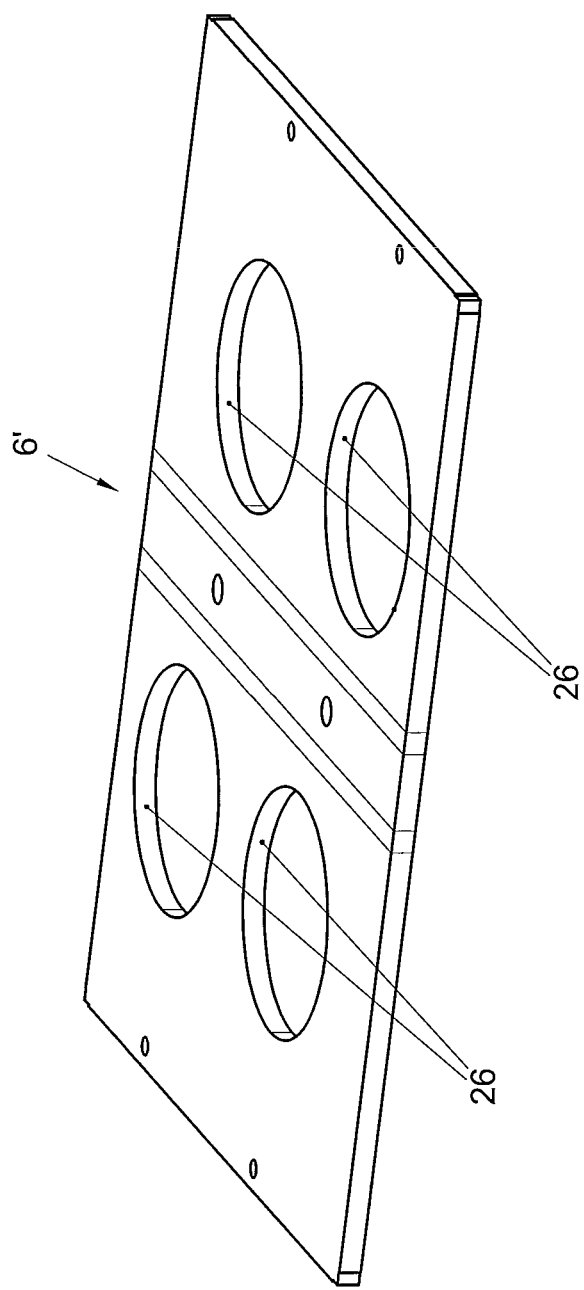
FIG. 13 shows a cylinder support part blank.
Figure 14:
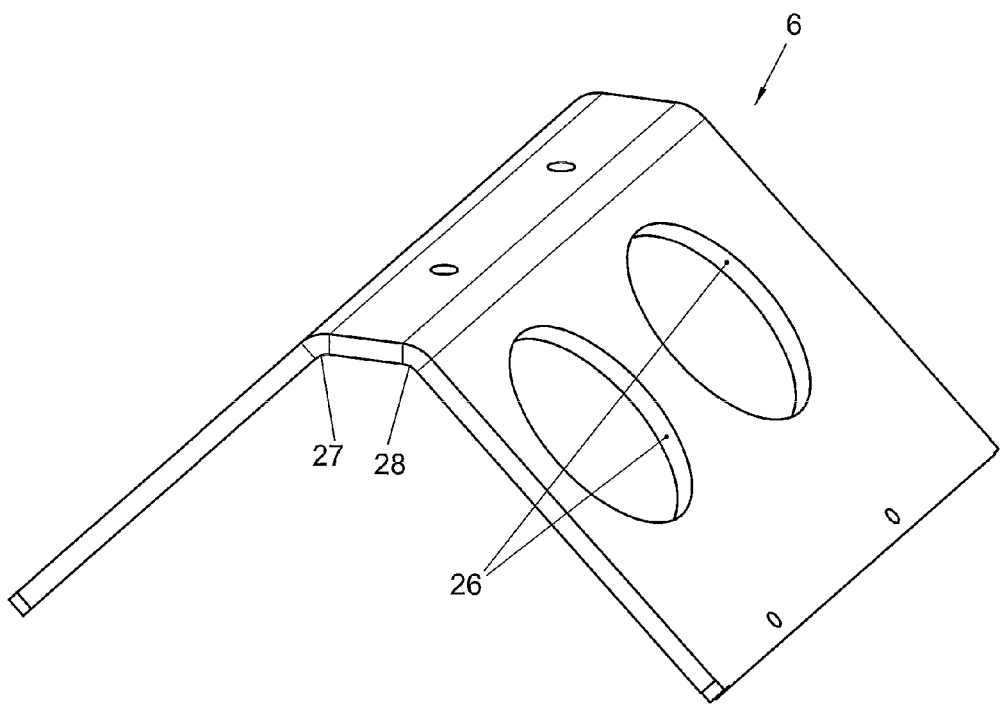
FIG. 14 shows a cylinder support part formed from the cylinder support part blank shown in FIG. 13.

FIG. 13 shows the cylinder support plate blank 6'. The cylinder support plate blank 6' is provided with cylinder recesses 26 for therein receiving the cylinders of the compressor. In FIG. 14 there is shown that the cylinder support plate blank 6' has undergone two angle-bending operations for forming two fold edges 27, 28. Thus, a saddle-shaped cylinder support part 6 has been formed.

With modern CNC angle bending machines the parallel folds 14-20, 27, 28 can be provided in an automated manner, and with high accuracy. Especially because the folds 14-20 and 27, 28 extend parallel to each other, automation of the provision of those folds is very well possible. As a very high angle-bending accuracy can be achieved with the modern CNC angle bending machines, it is possible to manufacture body parts 2, 3 and a cylinder support part 6 which are dimensionally so accurate that upon positioning with respect to each other and with respect to the other parts of the crankcase, possibly utilizing a positioning tool, already a stable relative positioning and engagement can be realized without a welding operation being necessary for this. After relative positioning of some or all parts, the various welded joints can be provided in a fully automated manner with a welding robot.

Figure 15:
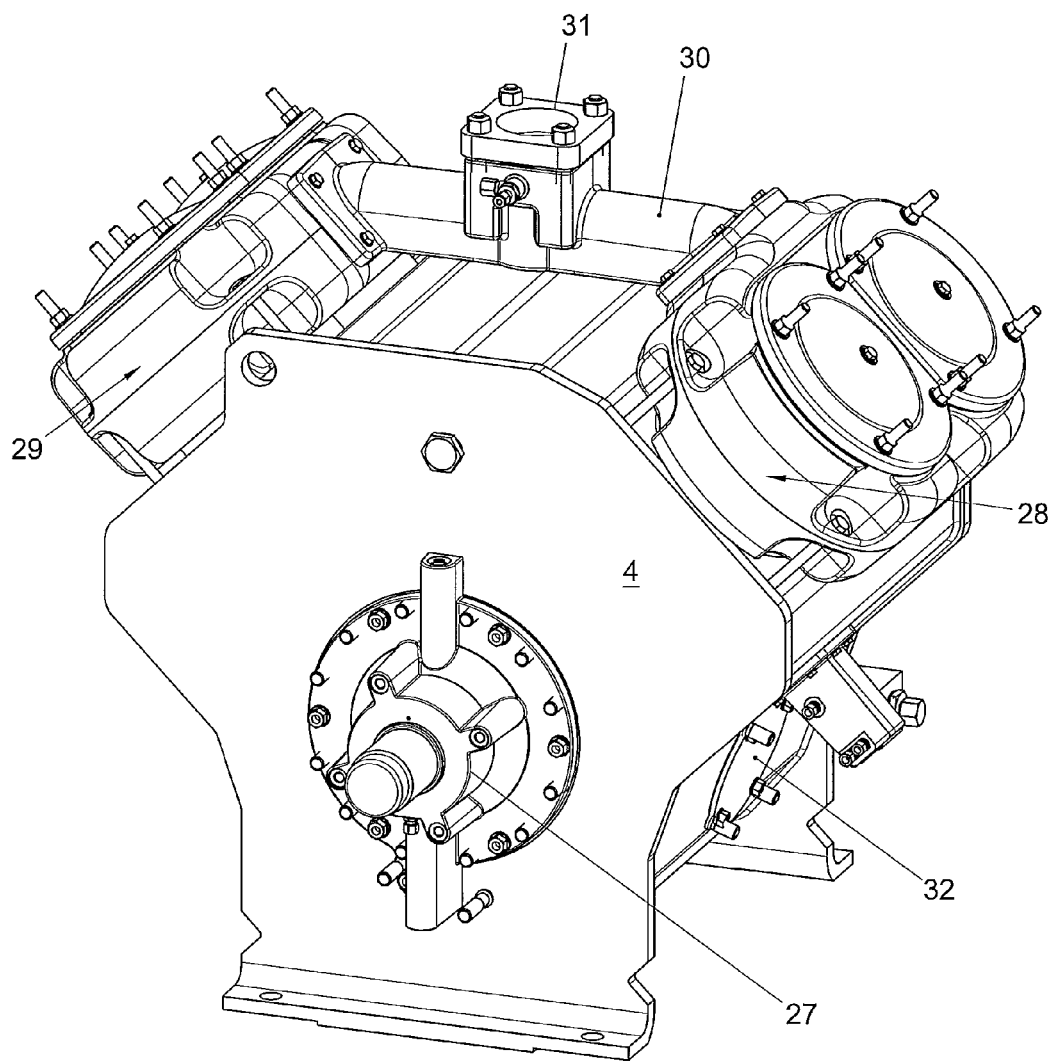
FIG. 15 shows a perspective view of a compressor provided with a crankcase as shown in FIGS. 1 and 2.
Figure 16:
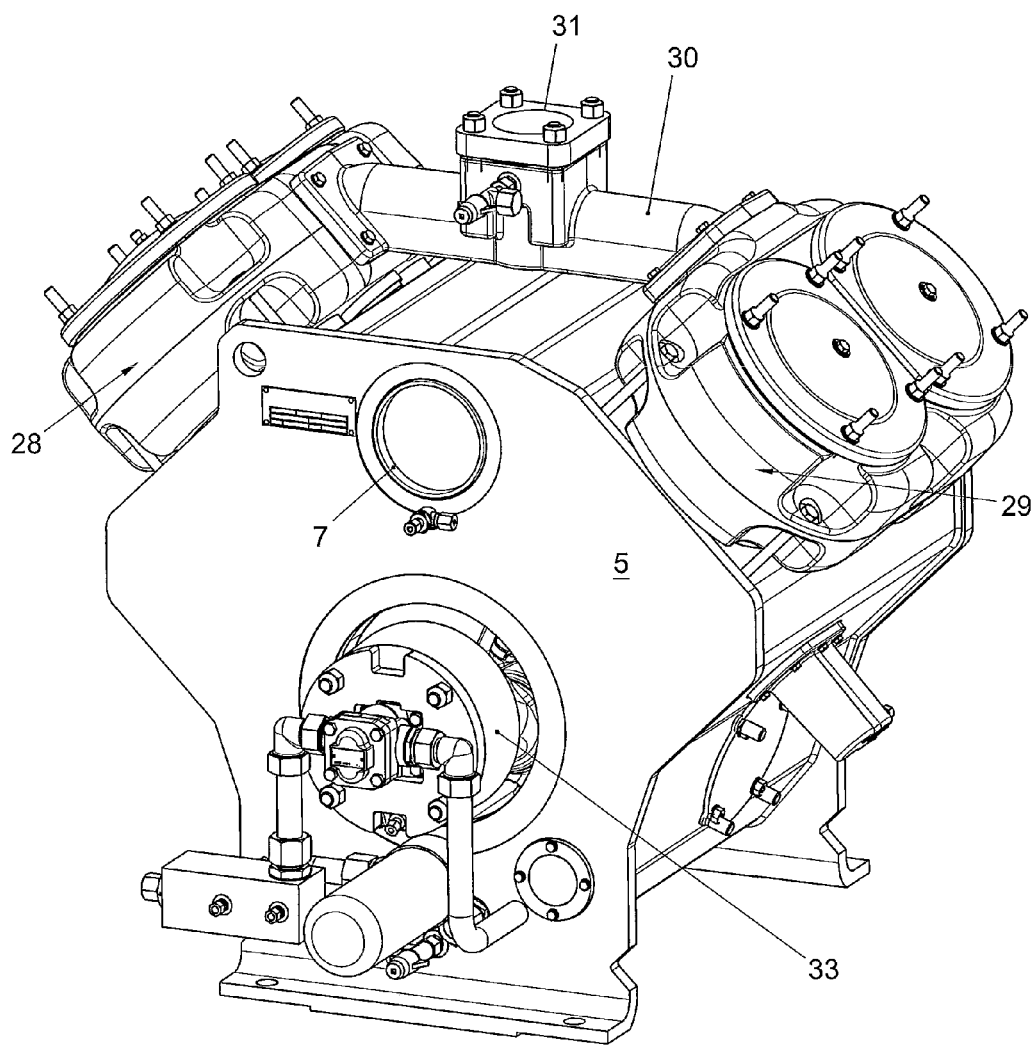
FIG. 16 shows a second perspective view of the compressor shown in FIG. 15.
Figure 17:
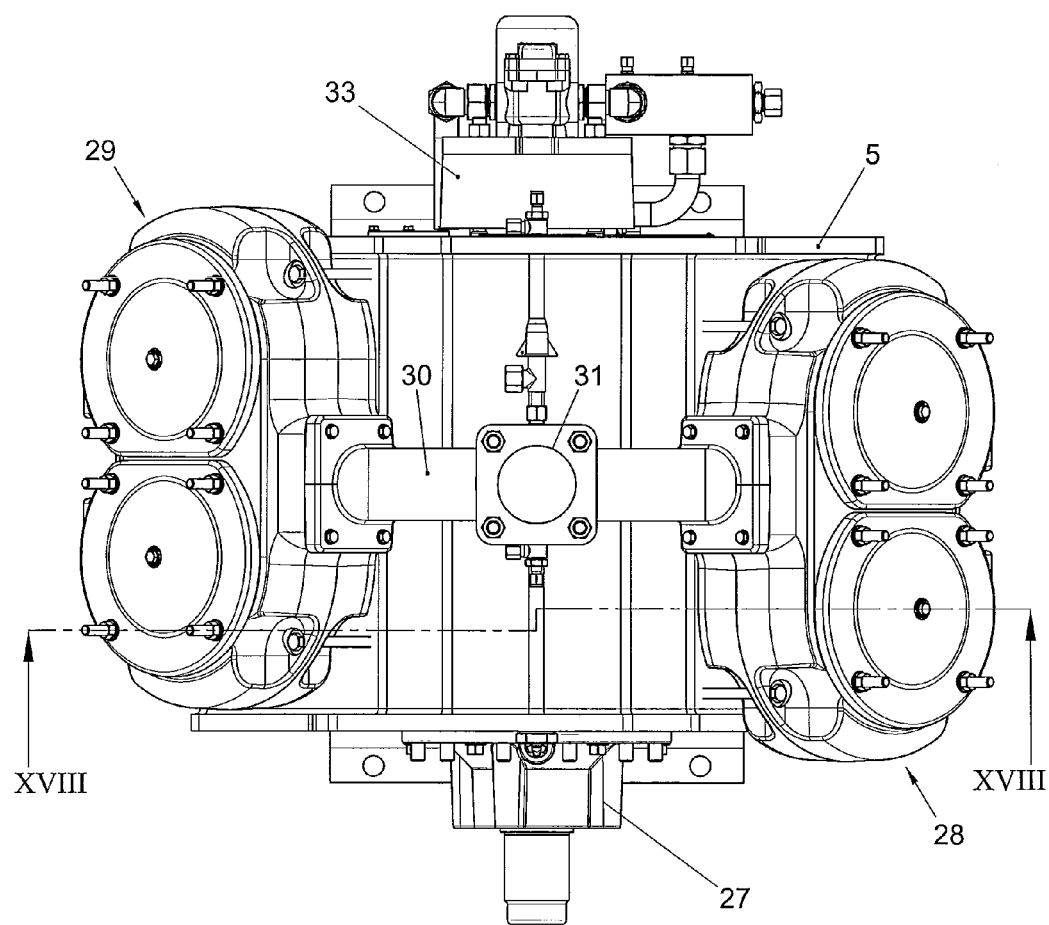
FIG. 17 shows a top plan view of the compressor from FIGS. 15 and 16.

FIGS. 15-17 show a piston compressor provided with a crankcase as shown in FIGS. 1-5. In FIGS. 15-17 the various piston compressor parts are mounted in the crankcase 1.

FIG. 15 shows the crankshaft bearing 27 which is mounted in recess 8 in the end wall 4. Further, the cylinder heads 28, 29 are shown, which are mutually in fluid communication via discharge line 30. Provided centrally on the discharge line 30 is a discharge outlet opening 31. The inspection recess 11 in the crankcase part 22 is closed off by a detachably mounted cover 32.

FIG. 16 shows the compressor from the opposite side to FIG. 15. FIG. 16 clearly shows the other crankshaft bearing 33 which is received in the recess 8' in the other end wall 5.

Figure 18:
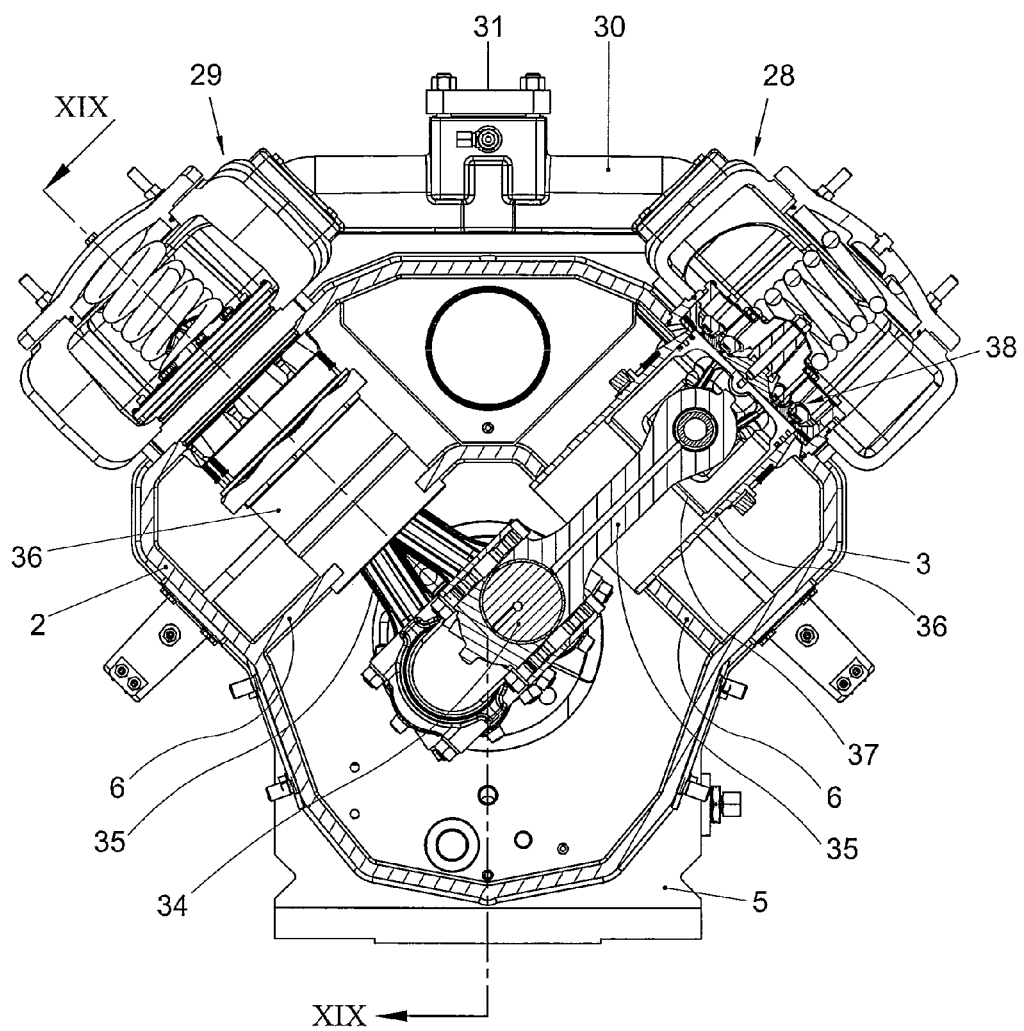
FIG. 18 shows a sectional view on line XVIII-XVIII from FIG. 17.

The top plan view from FIG. 17 and sectional elevations from FIGS. 16 and 18 show the crankshaft 34, connecting rods 35, cylinders 36, pistons 37 and valve plates 38.

Figure 19:
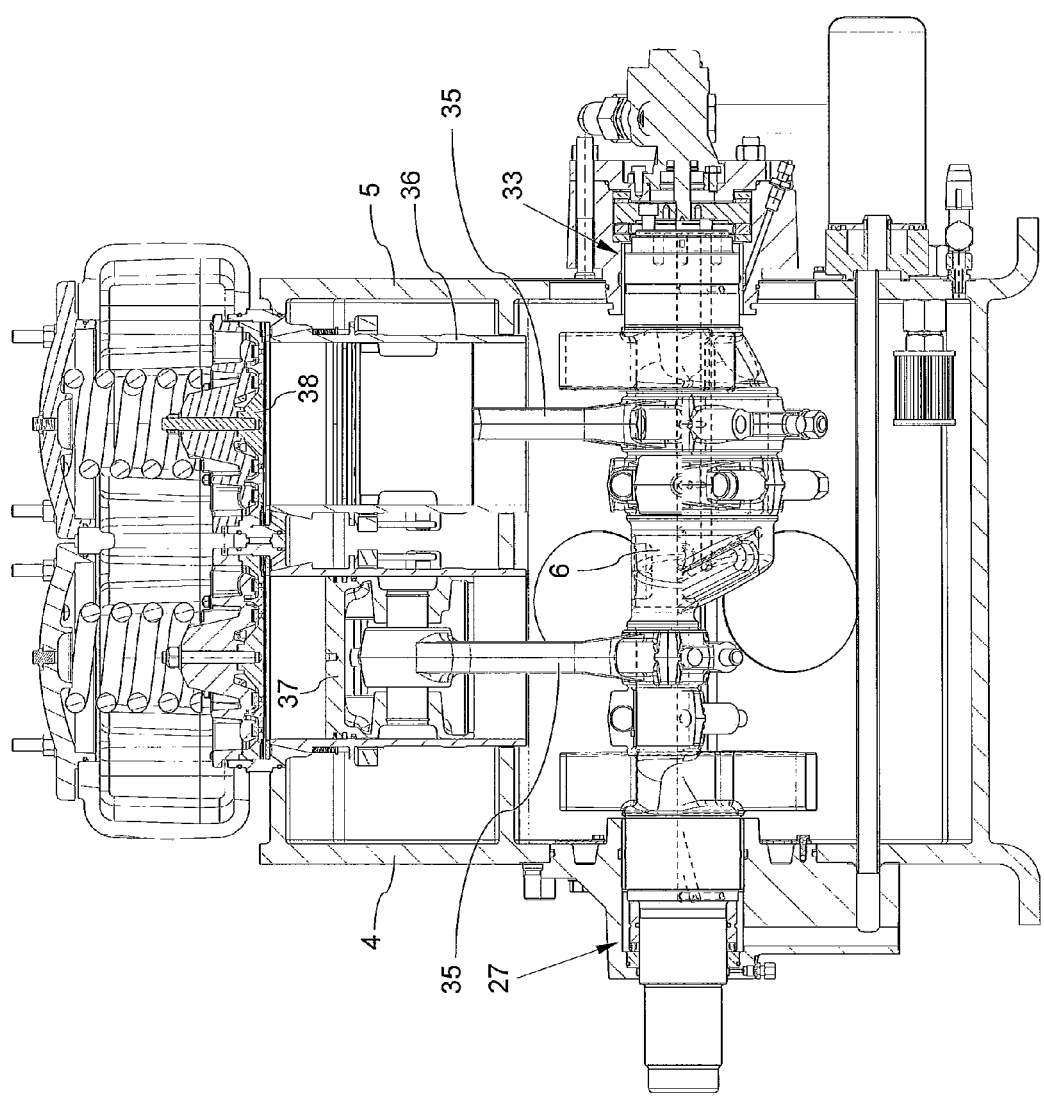
FIG. 19 shows a sectional view on line XIX-XIX from FIG. 18.

From the sectional elevations of FIGS. 18 and 19, it appears clearly that the cylinder heads 28, 29 are connected with the crankcase 1 through bolts and further make contact with the crankcase 1 only via an upper edge of the thin-walled cylinders 36. What can thus be accomplished is that the relatively hot cylinder heads 28, 29 in which the compressed gas is pressed are thermally well-insulated from the crankcase 1. This accordingly prevents the crankcase 1 rising in temperature. A low temperature of the crankcase 1 further results in the intake gas remaining relatively cold. This in turn leads to a better efficiency of the compressor, without this necessitating any active cooling with cooling liquid.

Figure 20:
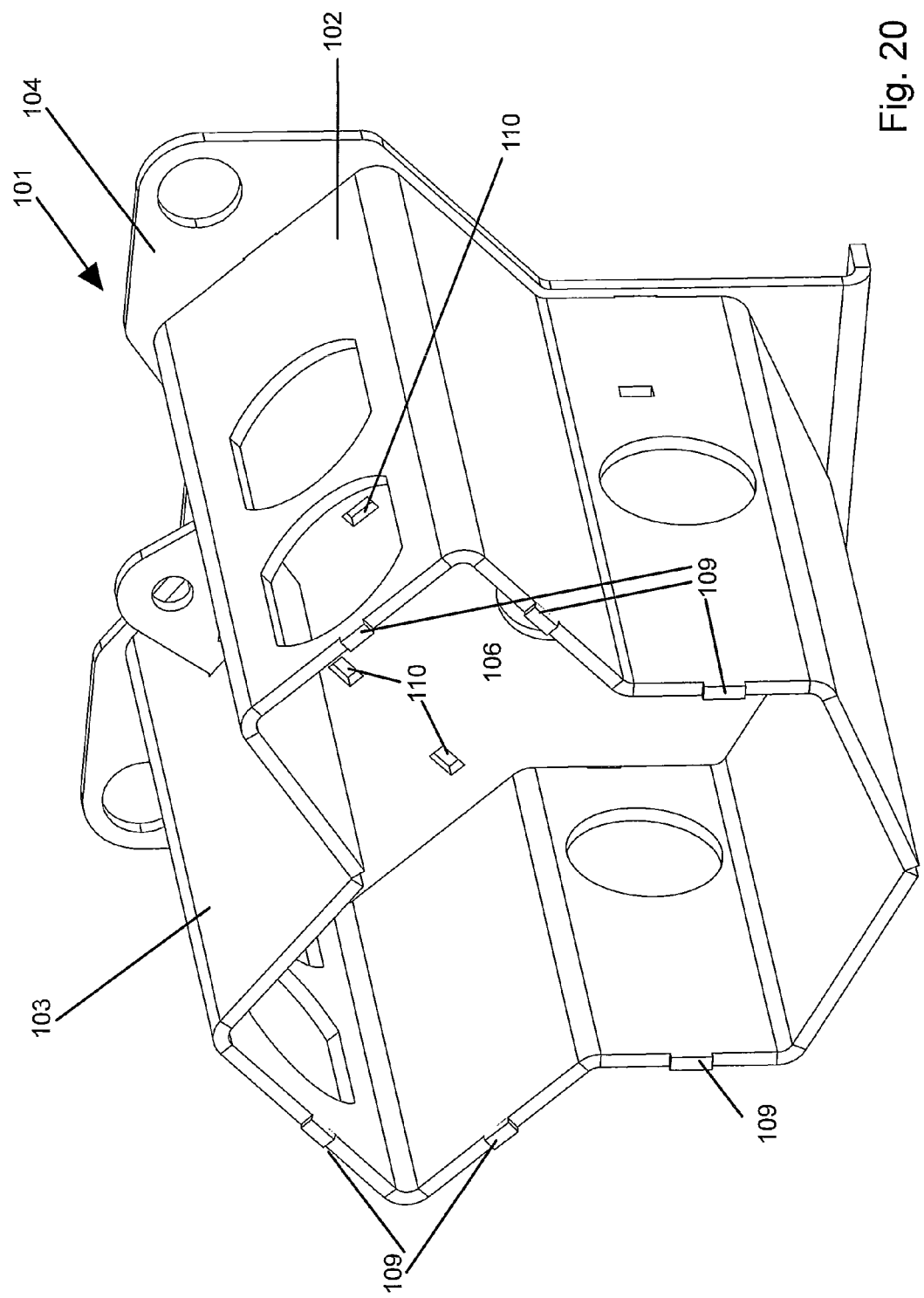
FIGS. 20-22 show in perspective view a second exemplary embodiment of a piston compressor crankcase.
Figure 21:
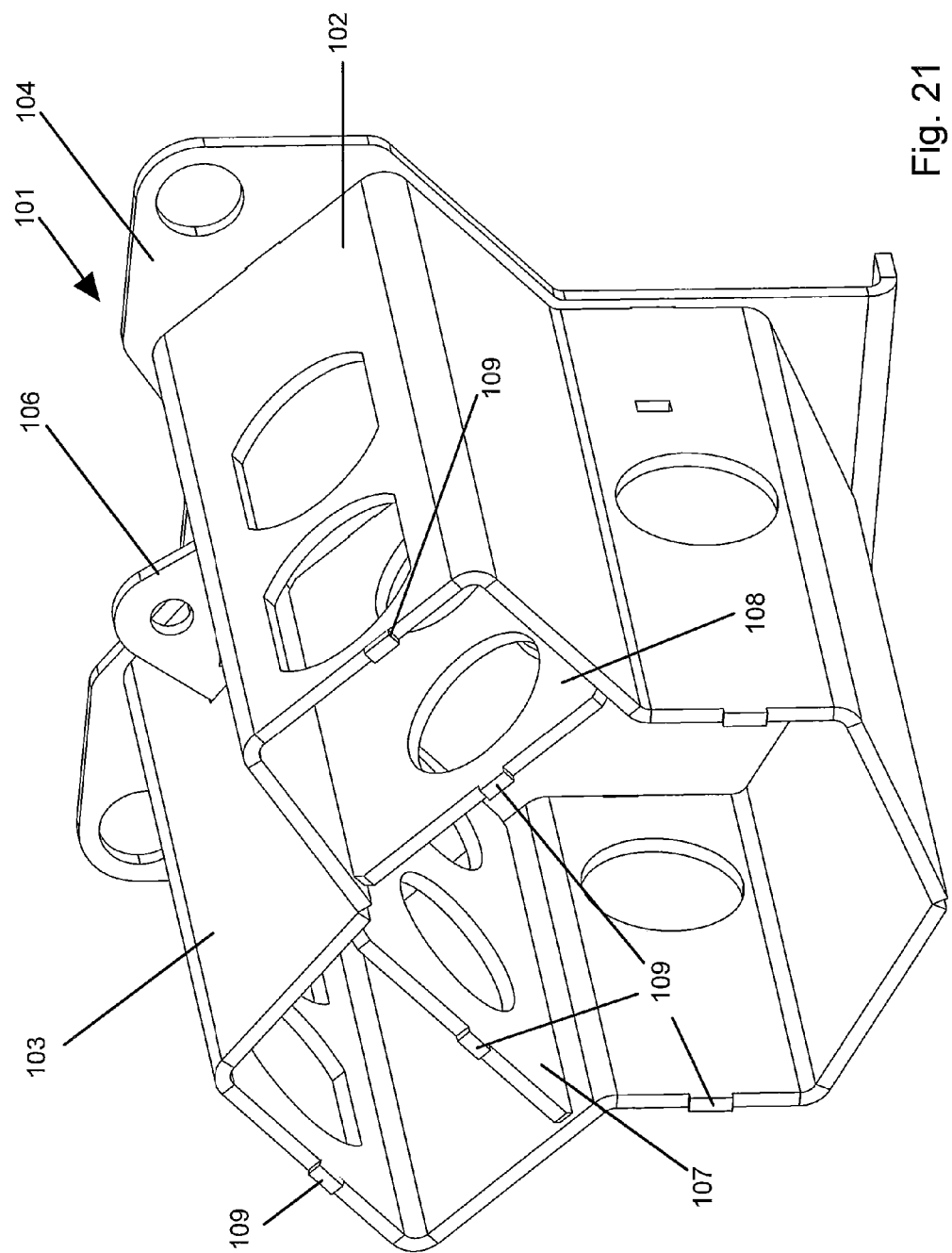
Figure 22:
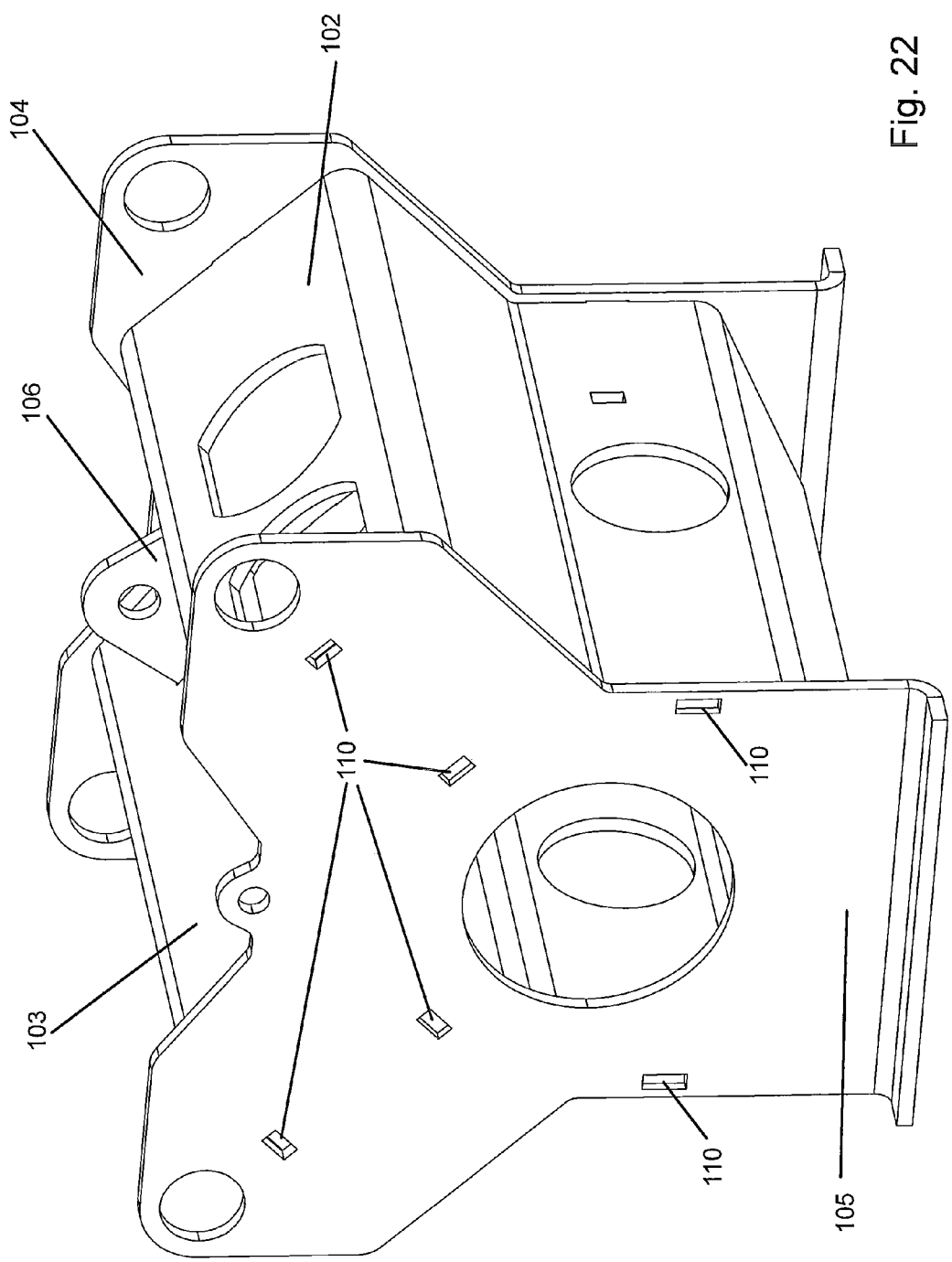

FIGS. 20-22 show a perspective view of a second exemplary embodiment of a piston compressor crankcase 101. FIG. 20 shows the piston compressor crankcase 101 without end wall 105 and cylinder support plates 107, 108. In FIG. 21 the cylinder support plates 107, 108 have been placed. And in FIG. 22 also the end wall 105 has been placed. The second exemplary embodiment is provided with two body parts 102, 103, two end walls 104, 105 and two cylinder support plates 107, 108. Further, a partition 106 is provided. The body parts 102, 103 and the cylinder support plates 107, 108 are each provided with lugs 109. The end walls 104, 105 and the partition 106 are provided with lug recesses 110 corresponding to the lugs. The lugs 109 and the corresponding lug recesses 110 simplify the relative positioning of the parts, which further simplifies automation of the relative positioning. Such lugs 109 and cooperating lug recesses 110 are optional. By virtue of the present design of the crankcase 1, the cutting operations, such as laser cutting or waterjet cutting, and the angle bending operations for providing the folds are simple to such an extent as to allow the various parts to be dimensioned so accurately that mutual engagement through friction is already sufficient for a temporary relative positioning of the parts, possibly utilizing a positioning tool.

Figure 23:
FIG. 23 shows an infrared image of a piston compressor of the exemplary embodiment shown in FIGS. 15-19.

Finally, FIG. 23 shows an infrared recording of an exemplary embodiment of a piston compressor corresponding to the exemplary embodiment represented in FIGS. 15-19. In FIG. 23, relatively cold parts are dark and relatively light parts are warm. It is clearly visible that the cylinder heads 28, 29 are hottest and that the parts of the crankcase 1 adjacent to the cylinder heads 28, 29 are relatively cold. This is the result of the low heat transfer between the cylinder heads 28, 29 and the crankcase 1. As mentioned, heat transfer is possible only via the relatively thin-walled cylinders, an upper edge of which is clamped between the crankcase 1 and the cylinder heads 28, 29. Thus a heat bridge between the cylinder heads 28, 29 and the crankcase 1 is provided which has a small cross-sectional surface, so that the heat transfer between cylinder heads 28, 29 and crankcase 1 is very limited. Apart from the cylinder heads 28, 29, only the oil in the bottom portion of the crankcase 1 is slightly warmed and there provides the somewhat lighter color in FIG. 23.

It is clear that the invention is not limited to the exemplary embodiments described but that various modifications within the framework of the invention, as defined by the claims, are possible.

The invention claimed is:

1. A method for manufacturing a crankcase of a piston compressor, wherein the piston compressor is provided with a crankcase which is provided with recesses for receiving cylinders therein and with at least an inlet opening, the method comprising:
providing two substantially rectangular body blanks manufactured from a flat sheet, which are each provided with two opposite end edges and two longitudinal edges;
providing desired cylinder receiving recesses for receiving cylinders in the two body blanks;
angle bending the body blanks in an angle bending machine for forming a body part with a limited number of folds;
manufacturing at least two substantially flat end walls from a flat sheet;
manufacturing a cylinder support part from a substantially rectangular sheet, comprising:
providing cylinder receiving recesses in the substantially rectangular sheet; and
subjecting the rectangular sheet to at least one angle bending operation for forming a saddle-shaped cylinder support part with a limited number, preferably one or two, of folds;
positioning the two body parts, the cylinder support part and the at least two end walls relative to each other using a positioning tool; and
connecting the end walls and the two body parts to each other with a welding robot, for forming the crankcase.

2. The method according to claim 1, wherein a substantially flat partition is manufactured from a flat sheet, wherein the partition is provided with at least one gas passage, wherein the partition is connected with the at least one body part by welding using a welding robot.

3. The method according to claim 2, wherein at least one of the body parts prior to the angle bending operation is provided with an inspection recess, wherein the inspection recess is so designed that a welding robot can reach therethrough into the interior space which is bounded by the body parts and the end walls and the partition, if any, in order to carry out a welding operation there, wherein said inspection recess is covered with a detachable cover.

4. The method according to claim 1, wherein for forming a body part from a body blank each body blank undergoes a limited number of angle bending operations, wherein in each angle bending operation a fold is provided which extends parallel to the longitudinal edges of the body blank, such that the body part is provided with a bottom part, a crankcase part, a cylinder case part, a cylinder head part which includes said cylinder receiving recesses, and a top part.

5. The method according to claim 4, wherein the angle bending operations are carried out such that when the crankcase is in a position of use the bottom part extends from a lower edge thereof obliquely outwardly upwards, wherein from an upper edge of the bottom part the crankcase part extends substantially vertically upwards, wherein from an upper edge of the crankcase part the cylinder case part extends substantially obliquely outwardly upwards, wherein from an upper edge of the cylinder case part the cylinder head part extends substantially obliquely inwardly upwards, wherein from an upper edge of the cylinder head part the top part extends obliquely inwards substantially horizontally, wherein one said longitudinal edge forms the free lower edge of the bottom part and the other said longitudinal edge forms the free edge of the top part, wherein both said longitudinal edges both extend in one imaginary plane, which in the position of use of the crankcase extends in substantially vertical direction.

6. The method according to claim 5, wherein said inspection recess in the at least one body part is situated in the crankcase part.

7. The method according to claim 5, wherein at least one of the body parts prior to the angle bending operation is provided with an inspection recess, wherein the inspection recess is so designed that a welding robot can reach therethrough into the interior space which is bounded by the body parts and the end walls and the partition, if any, in order to carry out a welding operation there, wherein said inspection recess is covered with a detachable cover.

8. The method according to claim 4, wherein at least one of the body parts prior to the angle bending operation is provided with an inspection recess, wherein the inspection recess is so designed that a welding robot can reach therethrough into the interior space which is bounded by the body parts and the end walls and the partition, if any, in order to carry out a welding operation there, wherein said inspection recess is covered with a detachable cover.

9. The method according to claim 1, wherein at least one of the body parts prior to the angle bending operation is provided with an inspection recess, wherein the inspection recess is so designed that a welding robot can reach therethrough into the interior space which is bounded by the body parts and the end walls and the partition, if any, in order to carry out a welding operation there, wherein said inspection recess is covered with a detachable cover.

10. The method according to claim 1, wherein in manufacturing the two body parts at least the end edges of each body blank are provided with lugs, wherein in manufacturing the end walls these end walls are provided with lug recesses corresponding to those lugs, wherein the end walls, through mutual engagement between the lugs and the lug recesses, are accurately positionable with respect to the at least one body part.

11. The method according to claim 10, wherein a partition is manufactured from a flat sheet and is thereby provided with a number of lug recesses and at least one gas passage, wherein the partition is connected with the at least one angle-bent blank by welding.

12. The method according to claim 1, wherein the manufacturing of the two body blanks, the rectangular sheet with cylinder receiving recesses for forming the cylinder support part, and the end walls and the partition if any, is carried out with a blanking tool.

13. The method according to claim 12, wherein the flat sheet from which the cylinder support part is manufactured is provided with two opposite end edges, wherein these end edges are provided with lugs, wherein the end walls, or the partition if any and an end wall, are provided with lug recesses which correspond to the lugs of the cylinder support part, wherein the cylinder support part is placed and positioned through mutual engagement between said lugs and lug recesses and is connected with the body parts and the end walls, or the partition and the end wall, by welding.

14. The method according to claim 1, wherein the manufacturing of the two body blanks, the rectangular sheet with cylinder receiving recesses for forming the cylinder support part, and the end walls and the partition if any, is carried out with a laser cutter.

15. The method according to claim 1, wherein the manufacturing of the two body blanks, the rectangular sheet with cylinder receiving recesses for forming the cylinder support part, and the end walls and the partition if any, is carried out with a waterjet cutter.

* * * * *

UNITED STATES PATENT AND TRADEMARK OFFICE
CERTIFICATE OF CORRECTION

PATENT NO. : 8,683,687 B2  
APPLICATION NO. : 12/744292  
DATED : April 1, 2014  
INVENTOR(S) : Bon et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 983 days.

Signed and Sealed this
Twenty-ninth Day of September, 2015

Michelle K. Lee
*Director of the United States Patent and Trademark Office*